United States Patent
Sethi et al.

(10) Patent No.: US 10,776,162 B2
(45) Date of Patent: *Sep. 15, 2020

(54) LOAD SHEDDING IN A DISTRIBUTED SYSTEM

(71) Applicant: ATLASSIAN PTY LTD, Sydney (AU)

(72) Inventors: Iccha Sethi, Austin, TX (US); Kevin Conway, Austin, TX (US)

(73) Assignee: Atlassian Pty Ltd, Sydney (AU)

( * ) Notice: Subject to any disclaimer, the term of this patent is extended or adjusted under 35 U.S.C. 154(b) by 160 days.

This patent is subject to a terminal disclaimer.

(21) Appl. No.: 15/894,280

(22) Filed: Feb. 12, 2018

(65) Prior Publication Data

US 2019/0250954 A1      Aug. 15, 2019

(51) Int. Cl.
    *G06F 9/50*      (2006.01)
    *G06F 11/07*     (2006.01)

(52) U.S. Cl.
    CPC ........ *G06F 9/5011* (2013.01); *G06F 9/5083* (2013.01); *G06F 11/076* (2013.01); *G06F 11/0709* (2013.01); *G06F 11/0793* (2013.01)

(58) Field of Classification Search
    None
    See application file for complete search history.

(56) References Cited

U.S. PATENT DOCUMENTS

| 5,381,546 A | 1/1995 | Servi |
| 2004/0179479 A1* | 9/2004 | Thibodeau ............ H04L 47/10 370/252 |
| 2010/0107166 A1 | 4/2010 | Topaloglu |

OTHER PUBLICATIONS

Seth, U.S. Appl. No. 16/022,669, filed Jun. 28, 2018, Office Action, dated Oct. 17, 2018.

* cited by examiner

*Primary Examiner* — Eric C Wai
(74) *Attorney, Agent, or Firm* — Hickman Palermo Becker Bingham LLP

(57) ABSTRACT

A load shedding system provides improved fault tolerance and resilience in message communications. The requesting service application may be configured to send data request(s) to a responding service application. A load shedding manager is programmed or configured to receive the data request(s) and determine, based on one or more configurable criteria and status information whether to allow the data request(s) to proceed or not. The criteria for making the determination may include various configurable settings, including error rate time window, and threshold values. The status information may include various information that describes the performance or health of the responding service, including, but not limited to: error rate for the responding service application's processing of incoming requests, latency of communication between the requesting service application and the responding service application, number of concurrent operations or requests being processed by the responding service application, CPU usage of the responding service application, disk usage of the responding service application, and other similar status information.

18 Claims, 8 Drawing Sheets

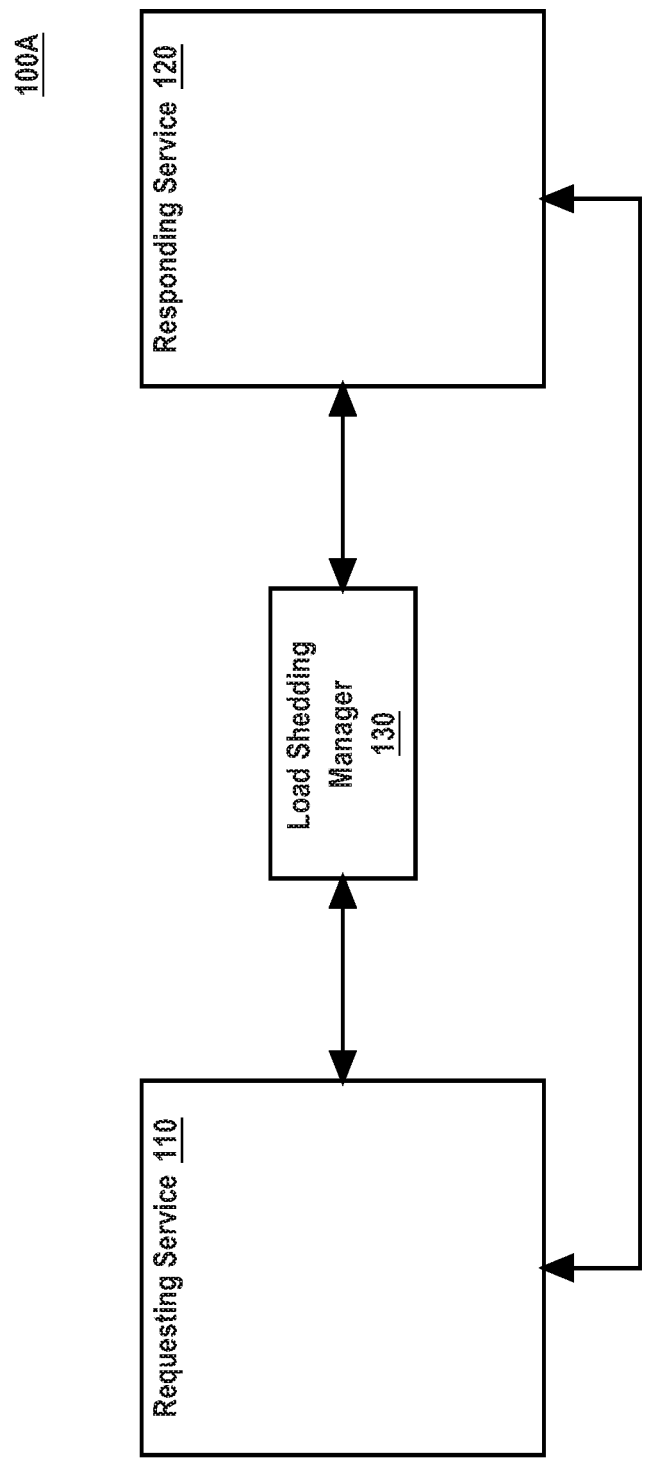

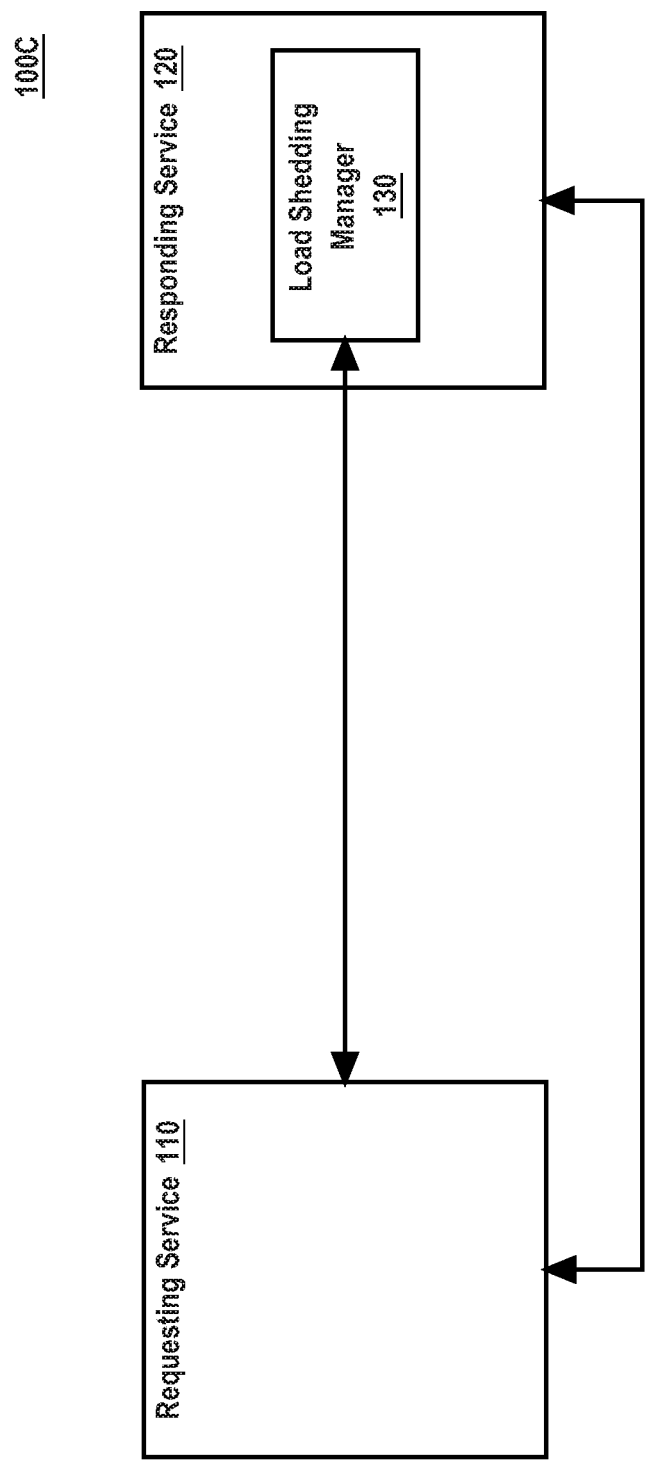

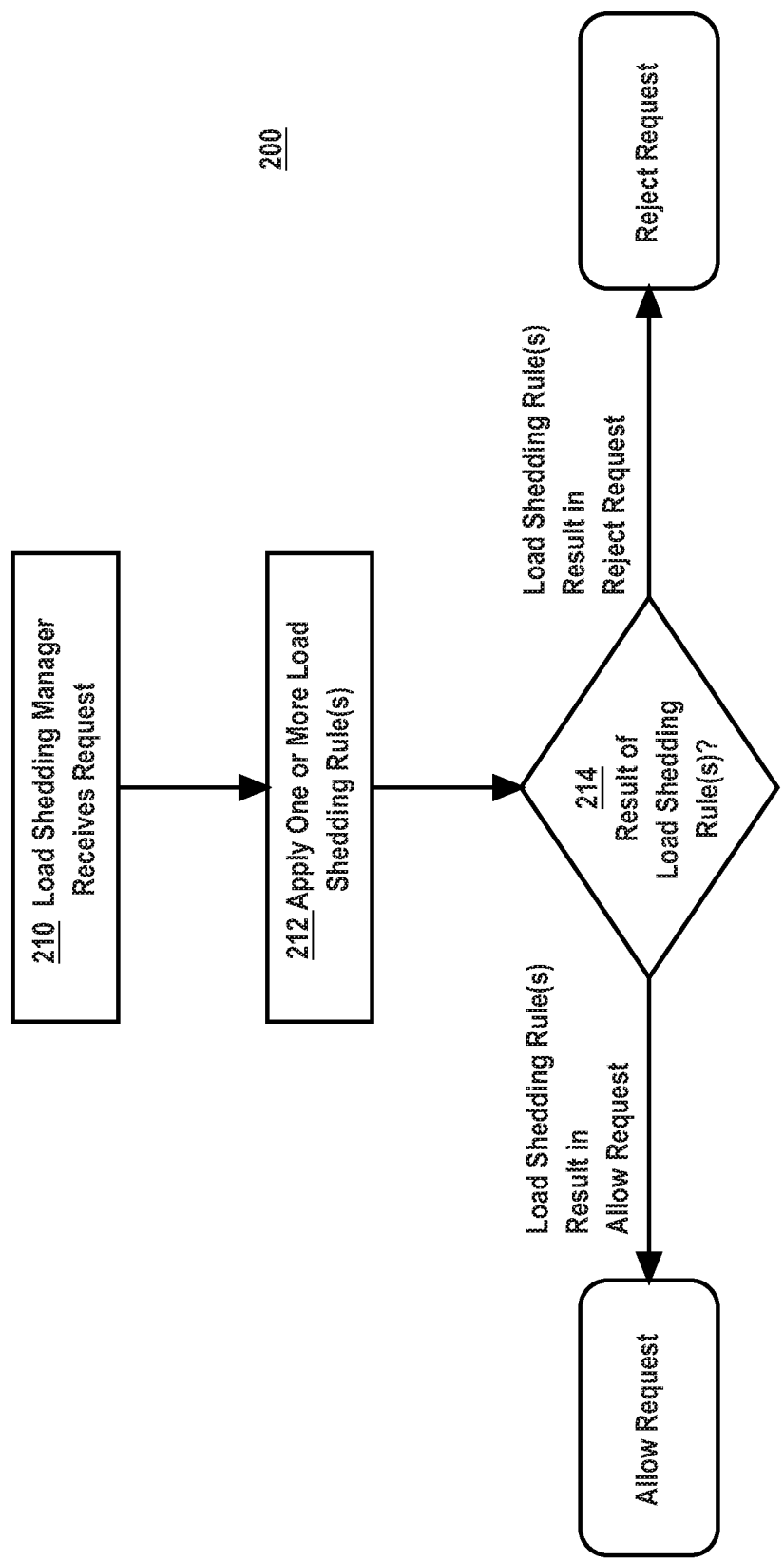

LOAD SHEDDING IN A DISTRIBUTED SYSTEM

TECHNICAL FIELD

The present disclosure relates to fault tolerance and resiliency in a distributed system. More specifically, the disclosure relates to load shedding in a distributed system to allow for graceful recovery from service performance issues or failures and/or system performance issues or failures.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a distributed system, services may be dependent on one another. For example, a requesting service may send requests to a responding service. During proper functioning of the distributed system, the responding service is expected to send a response to the requesting service in a timely manner. The response may be used by the requesting service to perform further processing. Thus, in this example, the requesting service is dependent on the responding service.

The requesting service may be adversely impacted when a responding service experiences performance issues, such as latency that causes the responding service to delay sending responses or outright failure of the responding service. If the requesting service does not receive a timely response from the responding service, the requesting service may attempt to retry sending the request multiple times. However, if no response is received, the requesting service may experience an error that may cascade to other downstream services in the distributed system.

One approach to providing resiliency and fault tolerance in such a distributed system is to implement a virtual circuit breaker at the requesting service to manage communication with the responding service. For example, HYSTRIX is an example of a library that is used to provide resiliency and fault tolerance via a virtual circuit breaker. The circuit breaker may be implemented at the requesting service and has three states: CLOSED, OPEN, and HALF-OPEN. In the CLOSED state, the circuit breaker will allow all requests to pass from the requesting service to the responding service. In the OPEN state, the circuit breaker will not allow any requests to pass from the requesting service to the responding service. In the HALF-OPEN state, a single request is passed from the requesting service to the dependent service to determine whether the circuit is ready to be CLOSED or should remain OPEN.

In this example circuit breaker architecture, the circuit breaker starts in a CLOSED state, thus allowing requests to be sent to the responding service. If the volume of requests from the requesting service to the responding service meets a certain volume threshold and the error rate of those requests exceeds an error rate threshold, then the circuit breaker is programmed to transition to an OPEN state, thus stopping further requests from being sent to the responding service. After a sleep period, the circuit breaker will transition from an OPEN state to a HALF-OPEN state and allow a single request to be sent to the responding service. If the responding service does not return a response in a timely manner, the request fails. If the request fails, then the circuit breaker returns to the OPEN state and awaits another sleep period before trying another request in a HALF-OPEN state. If the responding service return a response in a timely manner, the request succeeds. If the request succeeds, the circuit breaker transitions to a CLOSED state and all other pending requests to the responding service are sent and normal processing is resumed.

The above circuit breaker implementation, however, has many shortcomings. First, when a circuit breaker transitions from a HALF-OPEN state to a CLOSED state, the number of outgoing requests to the responding service may be very large. This large volume of outgoing requests may, in turn, cause the responding service to experience another failure due to a heavy load caused by the flood of requests, thereby causing the circuit breaker to transition to OPEN again. The process may then repeat itself, thereby never allowing the responding service to fully recover in a gradual way. This shortcoming is referred to as a "circuit flapping" problem.

Second, the sleep window in the circuit breaker implementation is a fixed amount of time. However, it is possible that the responding service has recovered before the end of the sleep window. Nonetheless, in the circuit breaker implementation, the requesting service will not send a request until the sleep window has completed, and the circuit breaker has transitioned to the HALF-OPEN state to send a single request. This means that it is possible that the responding service was fully recovered and ready to receive requests for some time while the requesting service was idling during a sleep window in an OPEN state. This is an inefficient use of the responding service, which could have started receiving requests earlier.

Third, the states of the circuit breaker implementation are a modified binary state, as either zero requests are sent in the OPEN state, all requests are sent in the CLOSED state, or a single request is sent in the HALF-OPEN state. This modified binary state of the circuit breaker implementation, however, does not allow for gradual recovery by the responding service. For example, if the responding service is at 50% capacity, the circuit breaker implementation will either send either zero requests, all requests, or a single request. However, the responding service could tolerate 50% of requests being sent. The modified binary state of the circuit breaker implementation, however, cannot account for sending 50% of requests.

Fourth, the existing circuit breaker implementation only sends a single request to the responding service in the HALF-OPEN state to determine whether to OPEN or CLOSE the circuit breaker, but this may be insufficient sample size in some scenarios and may result in the circuit breaker incorrectly reacting to false negatives regarding the status of the responding service. For example, if the responding service stores a cache and provides cache results to the requesting service in response to data requests, the responding service may experience a cache miss for a particular request for data received from the requesting service. The circuit breaker implementation may interpret the cache miss of the responding service as an error, even if the cache could successfully provide cache hits for other data requests. If the cache miss occurs during the single request that occurs in the HALF-OPEN circuit breaker state, the circuit breaker will transition from a HALF-OPEN state to an OPEN state, thereby halting further data requests from the requesting service to the responding service. However, the cache miss may have been appropriate for that particular request and the responding service would have been able to provide cache hits for additional requests. Since the circuit breaker only sends a single request to the responding service when it is in a HALF-OPEN state, an error during that request may be a false negative regarding the status of the responding service as a whole. A larger sampling size may provide a better indication as to the state of the responding service.

Fifth, the existing circuit breaker implementation only provides limited opportunities for customization and configuration of what rules to consider when determining whether a request should be sent to the responding service or not.

Thus, what is needed is improved techniques for load shedding in a distributed system to allow for graceful recovery from service performance issues or failures that addresses these issues.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIGS. 1A, 1B, 1C, and 1D are block diagrams of a load shedding system, according to various embodiments.

FIG. 2 illustrates example steps of a process for load shedding in a load shedding system, according to one embodiment.

Figure 1B:
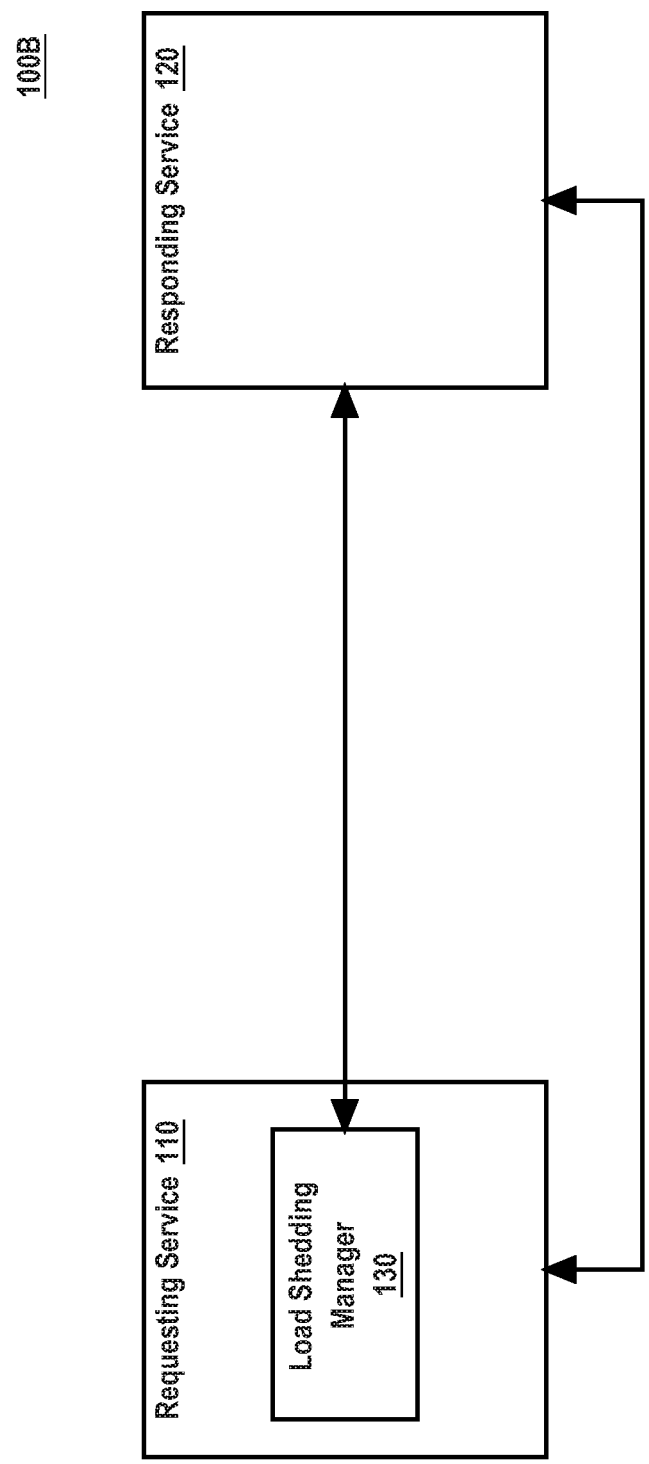

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
  2.1 LOAD SHEDDING MANAGER
    2.1.1 LOAD SHEDDING RULES
    2.1.2 LOGGING
    2.1.3 EXAMPLE CODE
3.0 EXAMPLE PROCESSES AND ALGORITHMS
4.0 IMPLEMENTATION MECHANISMS—HARDWARE OVERVIEW
5.0 IMPLEMENTATION MECHANISMS—SOFTWARE OVERVIEW
6.0 OTHER ASPECTS OF DISCLOSURE 1.0 GENERAL OVERVIEW

A load shedding system is described that provides fault tolerance and resilience in message communications of a distributed system. The load shedding system includes a plurality of services. A requesting service may be dependent on a responding service. The requesting service may be configured to send a data request message, such as an HTTP request, to the responding service. The responding service is configured to send a response to the requesting service in response to the data request. The response may then be used by the requesting service for further processing.

In an embodiment, a load shedding manager is implemented to provide fault tolerance and resiliency in data processing and message communications of the load shedding system. The load shedding manager may be implemented as part of the requesting service, as part of the responding service, and/or as an intermediary service between the requesting service and the responding service, or some combination of the above. The load shedding manager is programmed or configured to receive a data request and determine, based on one or more load shedding rules, whether to allow the data request to proceed or not. The load shedding rules may include logic that uses use one or more criteria including various configurable settings that describe the performance or health of the responding service, the performance or health of the requesting service, or any other user-defined metric for managing the load of the distributed system and/or for defining a fault tolerance strategy for the system. Examples of such criteria include, but are not limited to: number of incoming requests at either the load shedding manager or the responding service, the rate of requests at either the load shedding manager or the responding service, error rate for the responding service's processing of incoming requests, an error rate time window, a minimum request count, a lower error rate threshold, an upper error rate threshold, latency of communication with the responding service, latency of communication with the requesting service, number of concurrent operations or requests being processed by the responding service, number of concurrent operations being processed by the requesting service, CPU usage of the requesting service and/or responding service, disk usage of the requesting service and/or responding service, memory usage of the requesting service and/or responding service, temperature of the physical system for either the requesting service and/or the responding service, amount of entropy available in either the requesting service and/or the responding service, a randomly generated number, responses from an application programming interface (API) and other similar criteria or metrics as defined by a user operator.

The present techniques provide various improvements to the fault tolerance and resilience of a distributed system. The load shedding system allows for a scaled or gradual flow of requests during a recovery from the failure of the responding service or the responding system. In a circuit breaker implementation, a large volume of outgoing requests is sent from the requesting service to the responding service immediately after recovery and the large volume may cause the responding service or responding system to fail again. The present techniques allow for a gradual sending of outgoing requests, thereby allowing the responding service and responding system to gradually recover following a failure.

The present techniques also allow for immediate transmission of data requests to a responding service as soon as the responding service is capable of handling new requests after recovery. Unlike a circuit breaker implementation, where all requests are halted during a sleep window, the present techniques allow for gradual sending of requests to the responding service as soon as the responding service begins to recover, without needing to wait for a sleep window.

The present techniques allow for dynamic and/or proportional transmission of data requests based on the capacity of the responding service. Unlike a circuit breaker implementation, which can only send requests using a modified binary volume, the present techniques allow for sending a customized dynamic volume of requests to the responding service based on the capacity of the responding service or the host of the responding service. In an embodiment, the present techniques allow for precise tuning of a decision-making policy of a load shedding manager that allows for scaled load tolerance along a curve defined between two points that correspond to status information reported by the requesting service, the responding service, and/or a third party service. The curve may be defined using a linear rejection curve, an exponential rejection curve, a stair-step rejection curve, or some combination of these functions, based on the criteria that defines the decision-making policy of the load shedding rules.

In a circuit breaker implementation, a single data request is used to test the health of the responding service. The present techniques, however, can be configured to use a larger sample size to test the health of the responding service or the responding service's host, because the number of requests sent to the responding service is dynamic based on the performance and/or health of the responding service and/or the responding service's host.

Additionally, the present techniques provide for customization of the configuration settings that define the load shedding rules that are used for determining whether a request should be sent to the responding service or not.

2.0 EXAMPLE COMPUTER SYSTEM IMPLEMENTATION

FIGS. 1A, 1B, 1C, and 1D illustrate load shedding systems 100A, 100B, 100C, and/or 100D in which the techniques described herein may be practiced, according to some embodiments. Load shedding systems 100A, 100B, 100C, and 100D may be collectively referred to as load shedding system 100. In the examples of FIGS. 1A, 1B, 1C and 1D, load shedding system 100 is programmed or configured to manage fault tolerance and system resiliency of messages sent from a requesting service 110 to a responding service 120. Load shedding system 100 may be implemented across one or more physical or virtual computing devices, none of which is intended as a generic computer, since it is loaded with instructions in a new ordered combination as otherwise disclosed herein to implement the functions and algorithms of this disclosure. The example components of load shedding system 100 shown in FIG. 1 are implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. The functions described herein are intended to indicate operations that are performed using programming in a special-purpose computer or general-purpose computer, in various embodiments. Load shedding system 100 illustrates only a few of many possible arrangements of components configured to execute the programming described herein. Other arrangements may include fewer or different components, and the division of work between the components may vary depending on the arrangement.

Load shedding system 100 is a distributed system comprising a plurality of services. In the example of FIGS. 1A, 1B, 1C, and 1D, requesting service 110 and responding service 120 are examples of services shown to illustrate the concepts of the present disclosure, however, in other embodiments, more services may exist. A service consists of a computer programs, software, or dedicated computers that process computer data. For example, a service can be defined as any software process, system, data source application, hardware, or network infrastructure that is included in a distributed system. Examples of services include, but are not limited to: mobile applications, application servers, web servers, database servers, client software applications, scripts, job processes, etc. A service may be implemented on one or more host computing devices.

A requesting service 110 is a service that is programmed or configured to send data requests to a responding service 120. Responding service 120 is a service that is programmed or configured to receive data requests from requesting service 110 and generate a response. The response generated by responding service 120 is then sent from responding service 120 to requesting service 110. The response may then be used by requesting service 110 to perform further data processing. Communication between a requesting service 110 and a responding service 120 may be implemented using any known request-response protocol or client-server computing model. For example, in one embodiment, data requests sent from a requesting service 110 to a responding service 120 may include Hypertext Transfer Protocol (HTTP) requests. In this example, the responses sent from responding service 120 to requesting service 110 may include HTTP responses.

Figure 1D:
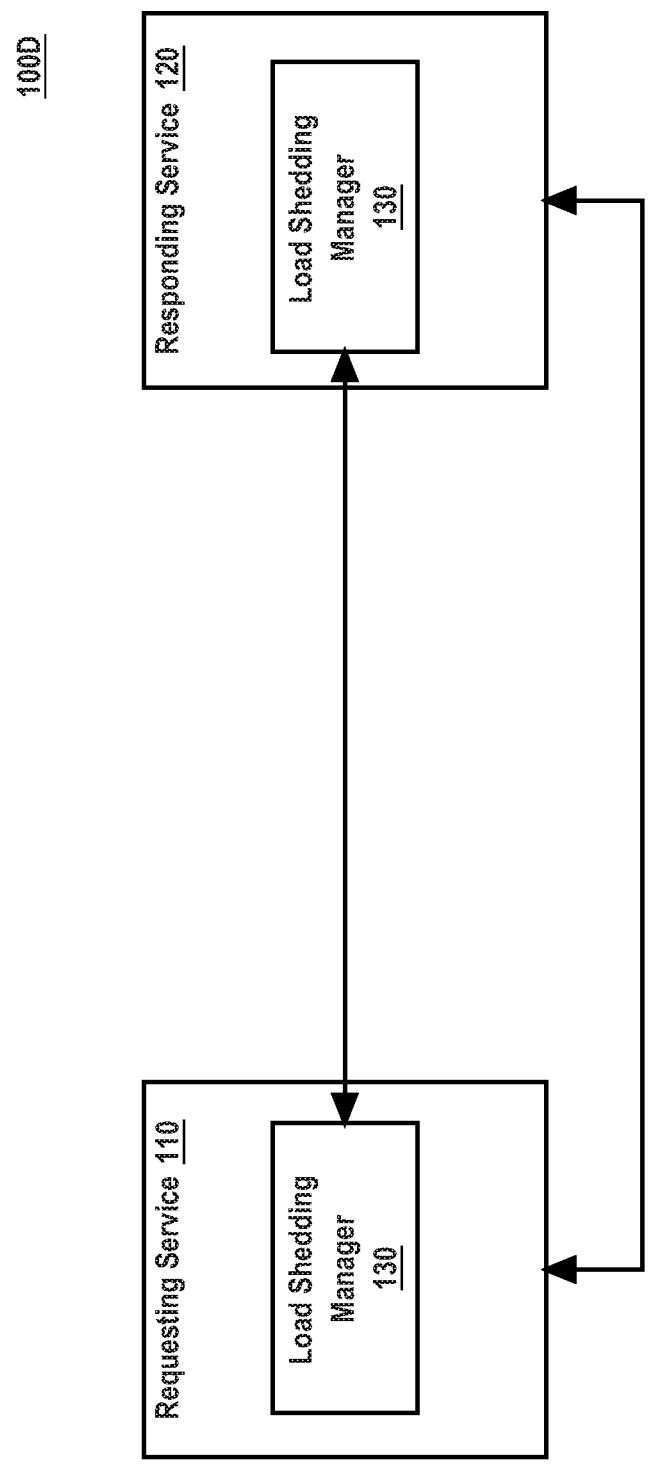

Load shedding system 100 includes a load shedding manager 130. Load shedding manager is programmed or configured to receive requests(s) from requesting service 110 and apply one or more load shedding rules to the request(s) to determine whether to allow the request to proceed for processing by responding service 120 or whether to reject the request based on one or more load shedding rules. At least one of the load shedding rules implemented by load shedding manager 130 provides for dynamic allowance and/or rejection of the incoming request(s), based on one or more user-defined criteria. By providing dynamic allowance and rejection of incoming request(s), load shedding manager 130 is able to ensure that responding service 120 is able to gracefully recover from a failure and that more than one request is sent to the responding service 120 to test the status of the responding service 120. In the example of FIG. 1A, load shedding manager 130 is implemented as a separate service from requesting service 110 and responding service 120. In the example of FIG. 1B, load shedding manager 130 is implemented as part of the requesting service 110. In the example of FIG. 1C, load shedding manager is implemented as a part of the responding service 120. In the example of FIG. 1D, load shedding manager is implemented partially at requesting service 110 and partially at responding service 120. Further details regarding load shedding manager 130 will be described herein.

2.1 Load Shedding Manager

Load shedding manager 130 is programmed or configured to receive requests(s) and determine, based on one or more load shedding rules, whether to allow the request(s) to proceed for processing by responding service 120 or whether to reject the request. For example, load shedding manager 130 may be implemented as a plugin, a library, a driver, or some other set of programming instructions.

Load shedding manager 130 is programmed or configured to receive request(s) from requesting service 110. Load shedding manager 130 may store data regarding one or more load shedding rules for determining whether to allow request(s) to proceed to responding service 120. Further details regarding load shedding rules will be described herein.

Additionally, in an embodiment, load shedding manager 130 is programmed or configured to receive status information from responding service 120 regarding the status of responding service 170. This status information may include any information related to the performance, health, or status of the responding service 120 or the host system for responding service 120, and may include information related to the number of incoming requests received at the responding service, the rate of requests at the responding service, the error rate for the responding service's processing of incoming requests, latency of communication with the responding service, number of concurrent operations or requests being processed by the responding service, CPU usage of the responding service or the responding service's host, disk usage of the responding service or the responding service's host, memory usage of the responding service or the responding service's host, temperature of a subsystem of the responding service's host, entropy available in the responding service, a randomly generated number, responses received from an API, and any other similar criteria related to the performance or functioning of the responding service 120.

Additionally, in an embodiment, load shedding manager 130 is programmed or configured to receive status information from requesting service 110 regarding the status of requesting service 110. The status information may include information related to the performance, health, or status of the requesting service 110 or the host system for the requesting service 110, and may include information related to the number of incoming requests sent by the requesting service, the rate of requests being sent by the requesting service, the error rate for the processing of outgoing requests of the requesting service, latency of communication with the requesting service, number of concurrent operations or requests being processed by the requesting service, CPU usage of the requesting service or the requesting service's host, disk usage of the requesting service or the requesting service's host, memory usage of the requesting service or the requesting service's host, temperature of a subsystem of the requesting service's host, entropy available in the requesting service, a randomly generated number, responses received from an API, and any other similar criteria related to the performance or functioning of the responding service 120.

In an embodiment, load shedding manager 130 is programmed or configured to receive status information from a third-party service or data source (not pictured). Thus, the status information received by load shedding manager 130 can be any user-defined criteria in different embodiments and may be received from the requesting service 110, the responding service 120 or some third-party source.

The status information may be used by the load shedding manager 130 to determine, based on one or more load shedding rules, whether to allow request(s) to proceed to responding service 120 for processing or whether the request(s) should be rejected. In another embodiment, status information may be measured, countered, or determined, at least in part, by load shedding manager 130 itself. For example, load shedding manager 130 may count the number of outgoing data requests to responding service 120 over a time period and count the number of errors received for those outgoing data requests, thereby allowing the load shedding manager 130 to determine an error rate for the responding service 120.

In FIG. 1A, load shedding manager 130 is depicted as a separate component from requesting service 110 and responding service 120, however, in different embodiments, load shedding manager 130 may be implemented as part of requesting service 110, as part of responding service 120, or partially as part of both requesting service 110 and responding service 120, as shown in FIGS. 1B, 1C, and 1D.

Implementation of load shedding manager 130 as part of requesting service 110, as shown in FIG. 1B, will result in client-side load shedding. In an embodiment, client-side load shedding may be beneficial in order to limit the amount of network traffic between requesting service 110 and responding service 120 when responding service 120 is experiencing performance issues or failure.

Implementation of load shedding manager 130 as part of responding service 120, as shown in FIG. 1C, will result in server-side load shedding. In an embodiment, server-side load shedding may be beneficial in order to avoid sending status information regarding the responding service 120 to requesting service 110 and/or to limit the amount of preliminary processing performed by requesting service 110 prior to sending outgoing request(s).

Implementation of load shedding manager 130 partially as part of requesting service 110 and partially as part of responding service 120, as shown in FIG. 1D, allows for implementation that includes the benefits of both client-side load shedding and server-side load shedding.

2.1.1 Load Shedding Rules

A load shedding rule is a set of configurable instructions or logic that defines a strategy for fault tolerance or resiliency of the load shedding system 100. A load shedding rule may compare one or more criteria to status information received at load shedding manager 130 in order to make a determination whether to allow request(s) to be sent to responding service 120 or whether to reject such request(s). The status information may include information regarding the status of the requesting service 110, responding service 120, the requesting service host, the responding service host, or any third-party system or service (not pictured). Thus, the status information may include any user-defined configuration setting and may be customized to define a particular fault tolerance and resilience strategy or policy for the particular implementation of the load shedding system 100.

Criteria comprises data value and/or function that is used to make a determination of whether to allow a request to be processed. In an embodiment, criteria of a load shedding rule may be defined, at least in part, by one or more user-defined configurable settings of the load shedding manager 130.

One example of a criteria utilized by a load shedding rule is an error rate time window that defines a period of time that the load shedding manager 130 should use for measuring the error rate of responding service 120. For example, if the error rate time window is configured as 60 seconds, the load shedding manager 130 may test, using one or more load shedding rules, the error rate of the responding service 120 over a moving 60 second window. Configuration of an error rate time window allows for dynamic testing of the error rate of the responding service 120 and fine-tuning of the load shedding system 100. An error rate time window should be configured such that it is long enough that a small number of errors does not dominate the error rate sampling. An error rate time window should be configured such that it is not too long. If an error rate time window is configured too long, the error rate time window will not accurately reflect the health or status of the responding service 120. For example, if the error rate time window is configured as one week, the measured error rate might not reasonably reflect the dynamic status of the responding service 120 in the last minute. Load shedding manager 130 may include one or more load shedding rules that use the error rate time window in order to determine whether to allow requests to proceed to responding service 120 or not.

As previously discussed, status information for the responding service 120 may include an error rate for outgoing request(s) to the responding service 120. In one embodiment, the error rate is measured over the previously discussed error rate time window, and in another embodiment, error rate is measured over the uptime of the responding service 120. In one embodiment, error rate is measured by the load shedding manager 130 by tracking the number of outgoing request(s) to responding service 120 and the number of errors received from responding service 120 for those requests. For example, if load shedding manager 130 allowed 100 request(s) to proceed to responding service 120 during the most recent error rate time window, but only 65% of those requests were successfully processed, the error rate would be 35%. An error would indicate that a response was not successfully returned in a timely manner or that a response was returned that indicates that the responding service 120 failed to process the request. In another embodiment, the error rate may be provided by the responding service 120 via status information sent from the responding service 120 to the load shedding manager 130, such as callbacks from outgoing requests from load shedding manager 130 to responding service 120.

In an embodiment, another example of a criteria utilized by a load shedding rule is a minimum request count threshold. A minimum request count threshold defines an expected minimum number of requests during the error rate time window. If the number of incoming requests at the load shedding manager 130 does not exceed this minimum request count threshold, the observed number of incoming requests is lower than would be expected. For example, if the error rate time window is 60 seconds, and the minimum request count threshold is 1000, then the load shedding manager 130 may expect to receive at least 1000 incoming requests in every 60 second window. Load shedding manager 130 may include one or more load shedding rules that use the minimum request count threshold to determine whether to allow requests to proceed to responding service 120 or not. For example, in one embodiment, a load shedding rule may determine that, if the minimum request count threshold for the current time window has not been exceeded, to allow incoming request(s) to proceed. Since the minimum request count threshold has not been exceeded, the load shedding manager 130 may determine that the sample size of incoming requests is not sufficiently large to perform a more complex load shedding rule, therefore, the incoming requests should proceed to responding service 120 until the minimum request threshold has been satisfied.

In an embodiment, another example of criteria used by a load shedding rule are error rate thresholds. Error rate thresholds define different breakpoint values for different behavior of the load shedding rule. For example, in one embodiment, a load shedding rule may include criteria for a lower error rate threshold and an upper rate threshold. A load shedding rule may determine, based on one or more error rate thresholds, how to treat an incoming request. For example, in one embodiment, a lower error rate threshold of 20% and an upper error rate threshold of 90%. A load shedding rule may then compare status information regarding the current error rate of the responding service 120 to the lower error rate threshold and the upper rate threshold to determine whether to allow an incoming request to proceed or not. For example, in one embodiment, if the error rate is less than the lower error rate threshold, an incoming request is allowed to proceed, and if the error rate exceeds the upper rate threshold, an incoming request is rejected. However, if the error rate is between the lower rate threshold and the upper rate threshold, a dynamic load shedding rule may be used to determine whether to allow or reject the incoming request.

As previously described, status information regarding the responding requesting service 110, responding service 120, and/or a third party source, may include any possible user-defined data, including but not limited to, information that describes the performance, health, or status of the requesting service, the responding service, or the computing device(s) on which the requesting service, and/or responding service operate. In an embodiment, an example of status information used by a load shedding rule is latency of communication with the requesting service or the responding service. Latency is the delay measured from sending a request to receiving a response from the requesting service 110 or the responding service 120. In an embodiment, latency may measure the delay between requesting service 110 and responding service 120, the delay between load shedding manager 130 and requesting service, 110, the delay between load shedding manager 130 and responding service 120, or some other system latency.

In an embodiment, another example of status information used by a load shedding rule is a value that represents the number of concurrent operations or requests being processed by the requesting service or the responding service. A higher number would indicate that the requesting service 110 or responding service 120 is experiencing a higher load. In one embodiment, the value that represents the number of concurrent operations or request being processed by the requesting service may be provided by the requesting service 110 to the load shedding manager 130 as status information. In one embodiment, the value that represents the number of concurrent operations or request being processed by the responding service may be provided by the responding service 120 to the load shedding manager 130 as status information.

In an embodiment, another example of status information used by a load shedding rule is the CPU usage of the requesting service 110, CPU usage of the responding service 120, or CPU usage of the computing device(s) on which the requesting service 110 or responding service 120 operates. CPU usage is a measure of the load being experienced by the processor(s) of the computing device(s) that are hosting a service. For example, if CPU usage approaches 100%, the load shedding manager may use one or more load shedding rules to determine that the responding service 120 is close to failure and that outgoing request(s) need to be throttled in order to allow responding service 120 to recover. Thus, the load shedding rules may determine, based on the CPU usage, whether to allow all or some subset of the incoming request(s) to proceed to responding service 120.

Likewise, similar criteria may be used for comparing to the status information in different load shedding rules, including, but not limited to: latency threshold(s) concurrent operations threshold(s), concurrent requests threshold(s), CPU usage threshold(s), disk usage threshold(s) and other similar criteria that may be configured via configurable settings of the load shedding manager 130. The criteria and status information described above only illustrate examples of criteria and status information that may be used by a load shedding rule to make a determination as to whether to allow request(s) to proceed to responding service 120 or not. Additional criteria may be used via configurable settings or additional status information regarding the requesting service 110, the responding service 120, or some other system.

In order to ensure that load shedding manager 130 allows for responding service 120 to provide for scaled or gradual recovery when it is experiencing failures or performance issues, at least one of the load shedding rule(s) is configured or programmed to allow a dynamic and/or proportional number of incoming request(s) to be processed by responding service 120 based on the status information received from responding service 120. In an embodiment, the load shedding rule would use a function and/or pseudo-random number generator to determine the dynamic number of incoming requests(s) to allow to be processed.

For example, in one embodiment, a simple load shedding rule may indicate that, for a given error rate of the responding service 120, the allowance rate of the load shedding rule would be inversely proportional to the error rate. This may be tested by generating a pseudorandom number and comparing it to the error rate of the responding service 120. If the pseudorandom number is less than the error rate, then the incoming request is rejected, otherwise the incoming request is allowed. Thus, in this example, if the responding service 120 is experiencing an error rate of 30%, then the load shedding manager 130 would reject a particular incoming request from being sent to the responding service 120 if the generated pseudorandom number for that request is less than 0.30, otherwise, the load shedding manager 130 would allow the incoming request to be sent to the responding service 120. This example load shedding rule would, on the whole, allow 70% of incoming request(s) to be sent to the responding service 120 while the error rate stays at 30%. If the error rate goes down, then the allowance rate of the load shedding manager 130 would dynamically increase in proportion to the change of the error rate. Thus, in this example, the load shedding manager 130 is configured to allow a number of request(s) to be sent to the responding service 120 based on load shedding rule that is proportional to the status information received from responding service 120. This is merely an example of one potential load shedding rule that provides for gradual recovery of the responding service 120. In this particular example, the load shedding rule provides a linear function for allowing a dynamic number of request(s) to be sent to the responding service 120. In different embodiments, the function may be non-linear, such as a step function, a logarithmic function, an exponential function, or some other function type that provides an allowance rate for incoming request(s) at the load shedding manager 130 that is dynamic, at least in part, based on status information received from the responding service 120.

In an embodiment, multiple load shedding rules may be applied by load shedding manager 130, thereby allowing for customized fault tolerance strategies for the load shedding system 100. In one embodiment, load shedding rules, functions that are used by the load shedding rules, and/or criterion used by the load shedding rules may be configured via one or more configurable settings of the load shedding system 100. These configurable settings allow for implementation of a customized fault tolerance strategy for a particular system and fine-tuning of the fault tolerance strategy for the particular system, by modifying the load shedding rules, functions, and/or parameters for the system.

2.1.2 Logging

In an embodiment, load shedding manager 130 is programmed or configured to create one or more log entries in a log. The log entries may include log entries for rejected incoming request(s) and/or allowed incoming request(s). In one embodiment, a log entry may include details regarding one or more criteria used by the load shedding manager 130 in determining of whether to reject or allow an incoming request to proceed to responding service 120. Thus, the log entries may be useful to users attempting to understand why the load shedding manager 130 rejected or allowed a particular data request. For example, in an embodiment, an example log entry may be depicted as follows:

example-service: ChanceErrorRate is 0.3 because ErrorRate is 30.0 because ErrorRate-error-count is 30 because ErrorRate-req-count is 100

In the above example log entry, ChanceErrorRate represents the value that is compared to the pseudorandom number that is generated, ErrorRate represents status information representing the error rate of the responding service 120 for the current error rate time window, ErrorRate-error-count represents the number of errors observed by load shedding manager 130 during the current error rate time window for requests sent to the responding service 120, and ErrorRate-req-count represents the total number of requests sent to the responding service 120 during the error rate time window. In other embodiments, different information may be included in the log entry, including, but not limited to timestamp information, information related to load shedding rules, information that identifies the request, information related to criteria used by the load shedding rules, configurable parameters used by the load shedding rules, and/or status information received from the responding service 120.

In an embodiment, load shedding manager 130 is programmed or configured to send one or more telemetry events to a telemetry service. The telemetry events may include events for rejected incoming requests and/or allowed incoming requests and may contain similar data as is contained in a log entry. A telemetry service may include any service that is capable of ingesting data specified in a telemetry event. For example, a telemetry service may receive telemetry events and use them to generate a graphical dashboard of the health of the system, to send notifications to users regarding the health of the system or any other telemetry function that may be used to monitor the activity of the load shedding manager.

2.1.3 Example Code

In an embodiment, example source code for implementing the load shedding manager 130 is described as follows:

```
var loadshedtransportCallback = func(r *http.Request)
    (*http.Response, error) {
        var logger = xlogevent.FromContext(r.Context( ))
        var aggregate = loadshedtransport.FromContext(r.Context( ))
        if aggregate != nil {
            var reason = fmt.Sprintf("example-service: %s is %f",
                aggregate.Name, aggregate.Value)
            var metric = aggregate.Name
            for aggregate.Source != nil {
                aggregate = aggregate.Source
                reason = fmt.Sprintf("%s because %s is %f",
                    reason, aggregate.Name, aggregate.Value)
            }
            logger.Error(logs.LoadShed{Reason: reason, Metric:
                metric})
            var stats = xstats.FromContext(r.Context( ))
```

-continued

```
            stats.Count("client.rejected", aggregate.Value,
                fmt.Sprintf("option:%s", aggregate.Name),
                "example-service")
        }
        return nil, loadshed.Rejected{Aggregate: aggregate}
    }
    var loadshedLastread = loadshedtransport.New(
        loadshed.New(loadshed.ErrorRate(lowerErrorRate,
            upperErrorRate, bucketSize, bucketCount,
            loadshedPreallocHint, lastreadMinReqCount)),
        loadshedtransport.Callback(loadshedtransportCallback),
        loadshedtransport.ErrorCodes([ ]int{500, 501, 502, 503,
            504}), // HTTP code that count as errors
    )
```

3.0 EXAMPLE PROCESSES AND ALGORITHMS

FIG. 2 illustrates a flow diagram of an example process 200 for performing load shedding using a load shedding system 100, according to one embodiment. FIG. 2 is intended to disclose an algorithm or functional description that may be used as a basis of writing computer programs to implement the functions that are described herein, and which cause a computer to operate in the new manner that is disclosed herein. Further, FIG. 2 is provided to communicate such an algorithm at the same level of detail that is normally used, by persons of skill in the art to which this disclosure is directed, to communicate among themselves about plans, designs, specifications and algorithms for other computer programs of a similar level of complexity. The steps of process 200 may be performed in any order, and are not limited to the order shown in FIG. 2.

In an embodiment, process 200 begins at step 210. In step 210, load shedding manager 130 receives a data request from requesting service 110 intended to be sent to responding service 120. Load shedding manager 130 is programmed or configured to determine, based on one or more load shedding rules, whether to allow the incoming request to be sent to responding service 120 for further processing or whether to reject the incoming request. In different embodiments, the logic of load shedding manager 130 may be implemented, in whole or in part, as a subsystem of requesting service 110, as a subsystem of responding service 120, and/or as a system independent from requesting service 110 and responding service 120. In an embodiment, the data request may be received by load shedding manager 130 over a network communicatively coupled to requesting service 110. For example, in one embodiment, the data request received may be an HTTP request received over a private network or the internet. The process 200 may then proceed to step 212.

In step 212, load shedding manager 130 is programmed or configured to apply one or more load shedding rules to determine whether to allow the incoming request received in step 210 to be processed by responding service 120 or whether the incoming request should be rejected. A load shedding rule is a set of instructions or logic that is programmed or configured to make a determination about whether to process an incoming data request. A load shedding rule may make such a determination based on one or more criteria and/or status information previously received from requesting service 110, responding service 120 and/or some third-party data source. Criteria may include any configurable data values, including, but not limited to, an error rate time window, a minimum request count, a lower error rate threshold, an upper error rate threshold, latency threshold, number of concurrent operations of responding service threshold, CPU usage threshold, disk usage threshold, or a temperature threshold. Status information is based, at least in part, on information received from requesting service 110, responding service 120 or some other data source and may represent, for example, the health, performance, and/or status of the requesting service 110 and/or the responding service 120. For example, status information may include, but is not limited to, information related to the error rate for the responding service's processing of incoming requests, latency of communication with the responding service, number of concurrent operations or requests being processed by the responding service, CPU usage of the responding service, disk usage of the responding service, and other similar status information. In one embodiment, status information may be broadcast by responding service 120 to load shedding manager 130. In another embodiment, status information may be received and measured by load shedding manager 130 as a part of a callback for one or more prior request(s) that were sent load shedding manager 130 to responding service 120. The process 200 may then proceed to step 214.

In step 214, the load shedding manager 130 determines, based on the result of the one or more load shedding rules applied in step 212, whether to allow the incoming request to be sent to responding service 120 for further processing or whether to reject the incoming request. In an embodiment, at least one load shedding rule of the one or more load shedding rule(s) contains logic or instructions for dynamic load shedding, such that the allowance rate of step 214 is dynamic, at least in part, based on the status information received. For example, in one embodiment, the load shedding rule may include a linear function, step function, a logarithmic function, an exponential function, or some other combination of these and other functions to generate a dynamic result that allows some, but not all incoming data requests, to be allowed to be sent to responding service 120 under circumstances where the responding service 120 is experiencing a performance issue but has not been completely disabled. In an embodiment, the function may compare a generated pseudorandom number to one or more criteria and/or status information to make the determination of whether to allow the request or not.

In step 214, if the result of the one or more load shedding rules is that the request should be allowed, then the load shedding manager 130 may send the request to responding service 120 for further processing. In an embodiment, load shedding manager 130 may wait for a callback from the responding service 120 for the data request, which may include status information related to the performance of the responding service 120 and/or the status of the processing of the request. On the other hand, if the result of the one or more load shedding rules is that the request should be rejected, then the load shedding manager 130 may reject the request. For example, in one embodiment, the load shedding manager 130 may send a rejection message to requesting service 110 to indicate that the request has been rejected. The requesting service 110 may have application-specific instructions for how to handle such a rejection. In an embodiment, load shedding manager 130 may also create a log entry that describes the criteria and/or status information used to determine, via the one or more load shedding rules, whether to allow the request to be processed or not. The process 200 may then end.

Figure 3:
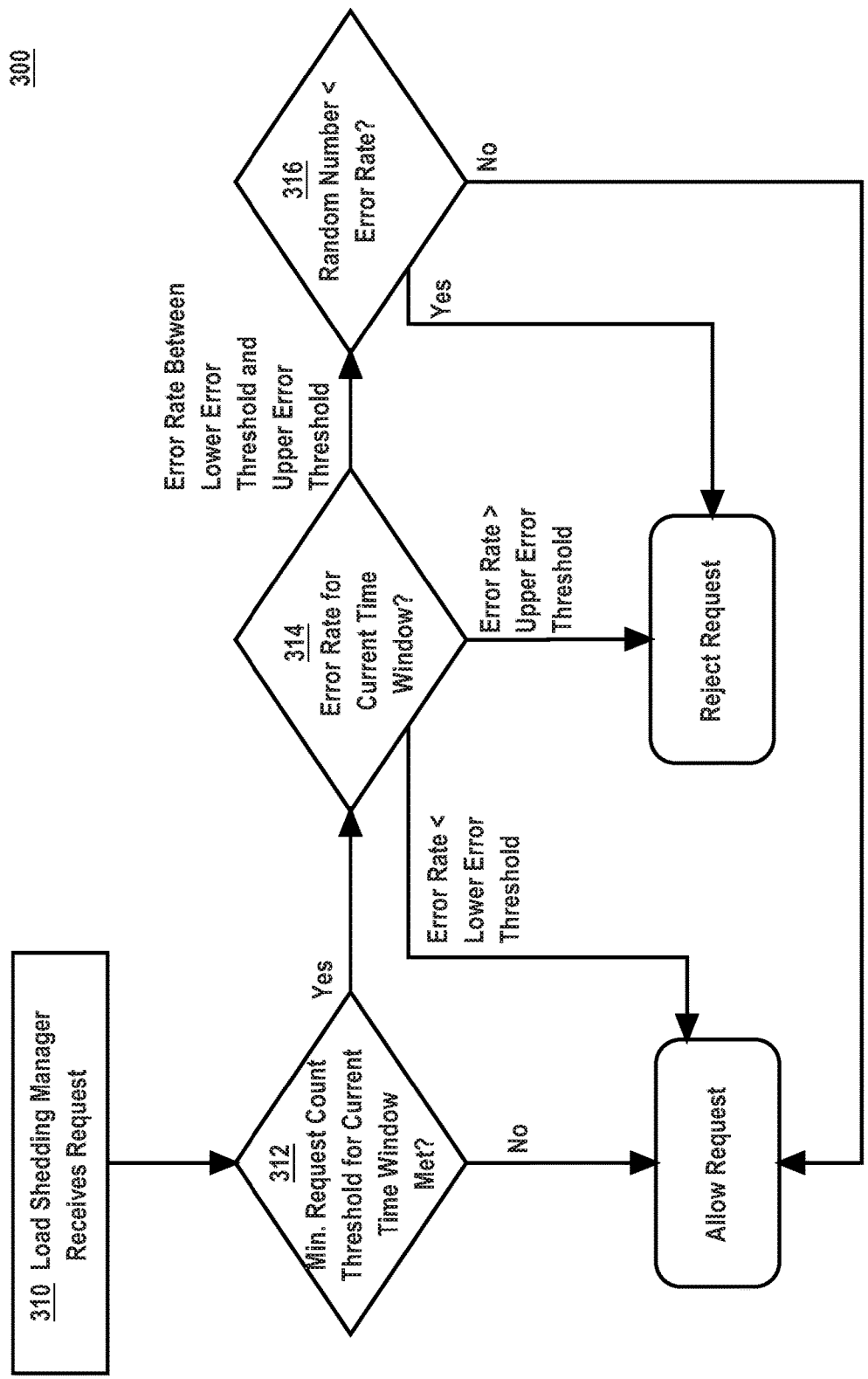
FIG. 3 illustrates example steps of a process for load shedding in a load shedding system, according to one embodiment.

FIG. 3 illustrates a flow diagram of an example process 300 for performing load shedding using a load shedding system 100, according to one embodiment. FIG. 3 is intended to disclose an algorithm or functional description that may be used as a basis of writing computer programs to implement the functions that are described herein, and which cause a computer to operate in the new manner that is disclosed herein. Further, FIG. 3 is provided to communicate such an algorithm at the same level of detail that is normally used, by persons of skill in the art to which this disclosure is directed, to communicate among themselves about plans, designs, specifications and algorithms for other computer programs of a similar level of complexity. The steps of process 300 may be performed in any order, and are not limited to the order shown in FIG. 3.

The implementation of FIG. 3 is intended to provide an illustrative example of how process 200 in FIG. 200 may be implemented with specific examples of load shedding rules, according to one embodiment. The techniques described in process 300, however, are merely exemplary, and particular implementation of the techniques of this disclosure may use configurable or customized load shedding rules, criteria, and/or status information for a particular load shedding system.

In an embodiment, process 300 begins at step 310. In step 310, load shedding manager 130 receives a data request from requesting service 110 intended to be sent to responding service 120. Load shedding manager 130 is programmed or configured to determine, based on one or more load shedding rules, whether to allow the incoming request to be sent to responding service 120 for further processing or whether to reject the incoming request. In different embodiments, the logic of load shedding manager 130 may be implemented, in whole or in part, as a subsystem of requesting service 110, as a subsystem of responding service 120, and/or as a system independent from requesting service 110 and responding service 120. In an embodiment, the data request may be received by load shedding manager 130 over a network communicatively coupled to requesting service 110. For example, in one embodiment, the data request received may be an HTTP request received over a private network or the internet. The process 300 may then proceed to step 312.

In step 312, load shedding manager 130 compares a minimum request count threshold to a request count for a current error rate time window. Step 312 is an example of a load shedding rule. The minimum request count threshold is criteria of the load shedding rule, and is a value that represents a previously provided configurable setting for the minimum number of expected incoming data requests the load shedding manager 130 is expected to receive in an error rate time window. For example, if the minimum request count threshold is set to 100, then the load shedding manager 130 would expect 100 or more incoming data requests for a given error rate time window The error rate time window is another criteria of the load shedding rule, and is value that represents a previously provided configurable setting for the period of time for which the load shedding manager 130 should be measuring the error rate to ensure that the number of incoming request is a sufficient sample size. Thus, if the error rate time window is configured as 60 seconds, then the minimum request count threshold would be compared to the request count for the prior 60 seconds of uptime. The request count for the current time window is an example of status information that represents the number of prior data requests that the load shedding manager 130 sent to the responding service 120 during the error rate time window. If the request count does not exceed the minimum request count threshold, then the load shedding manager 130 may determine that the incoming request received in step 310 may be allowed to be sent to responding service 120, as there have not been a sufficient number of prior incoming requests to warrant rejecting the current incoming request. If the request count exceeds the minimum request count threshold, then the process 300 may proceed to step 314.

In step 314, load shedding manager 130 is programmed or configured to compare the error rate for the current error rate time window to a lower error rate threshold and an upper error rate threshold. Step 314 is an example of a load shedding rule. The error rate is an example of status information received from responding service 120. In an embodiment, the error rate measures the ratio of outgoing requests to responding service 120 that experienced an error to the total number of outgoing requests to responding service 120, for the current error rate time window. Lower error rate threshold and upper error rate threshold are examples of criteria used by the load shedding rule to determine whether to allow an incoming request to proceed to responding service 120 for processing or not. If the error rate for the current error rate time window is less than the lower error rate threshold, then the incoming request is allowed to proceed to responding service 120 for processing. If the error rate or the current rate time window is greater than the upper error rate threshold, then the incoming request is rejected and not allowed to proceed to responding service 120 for processing. If the error rate is between the lower error rate threshold and the upper rate threshold, the process 300 proceeds to step 316 for application of another load shedding rule. The load shedding rule of 314 thus provides a simplified step function for determining whether to allow an incoming request to proceed or not. The step function is proportional based on the error rate of the responding service 120, an example of status information received from the responding service 120. The step function of 314 includes steps for three ranges of error rates: from 0% to the lower error rate threshold, from the lower error rate threshold to the upper rate threshold, and from the upper rate threshold to 100%.

In step 316, load shedding manager 130 compares a random number generated by a pseudorandom number generator to the error rate. Step 316 is an example of a load shedding rule. In step 316, if the random number is less than the error rate, then the incoming request is rejected and not sent to the responding service 120. If the random number is greater than or equal to the error rate, then the incoming request is allowed to proceed to responding service 120 for further processing. The error rate used in this step is an example of status information received from the responding service 120. The load shedding rule of 316 thus represents a linear function that dynamically allows some, but not all, incoming requests to proceed to processing by the responding service 120. In this case, the determination is made, based on the random number that is generated by load shedding manager 130 for the request. For example, if the error rate is 30%, it would be expected that step 316 would reject 30% of incoming requests and allow 70% of incoming requests. However, if the error rate is 55%, it would be expected that step 316 would reject 55% of incoming requests and allow 45% of incoming requests. Thus, the load shedding rule of step 316 provides an inversely proportional linear function that can be used to determine whether to allow incoming requests to be processed or not. The result of this load shedding rule is dynamic in relation to the error rate for the current error rate time window. Thus, if the error rate changes, the allowance and rejection rate of the load shedding rule dynamically changes, as the error rate is criteria that is used for testing the load shedding rule. The dynamic nature of the load shedding rule thus lowers the computing burden on responding service 120 when the responding service 120 is experiencing performance issues, thus allowing for improved recovery of the system, rather than flooding the responding service 120 with requests.

Once the load shedding manager 130 has determined whether to allow or reject the incoming request, the process 300 may end.

4.0 IMPLEMENTATION MECHANISMS—HARDWARE OVERVIEW

Figure 4:
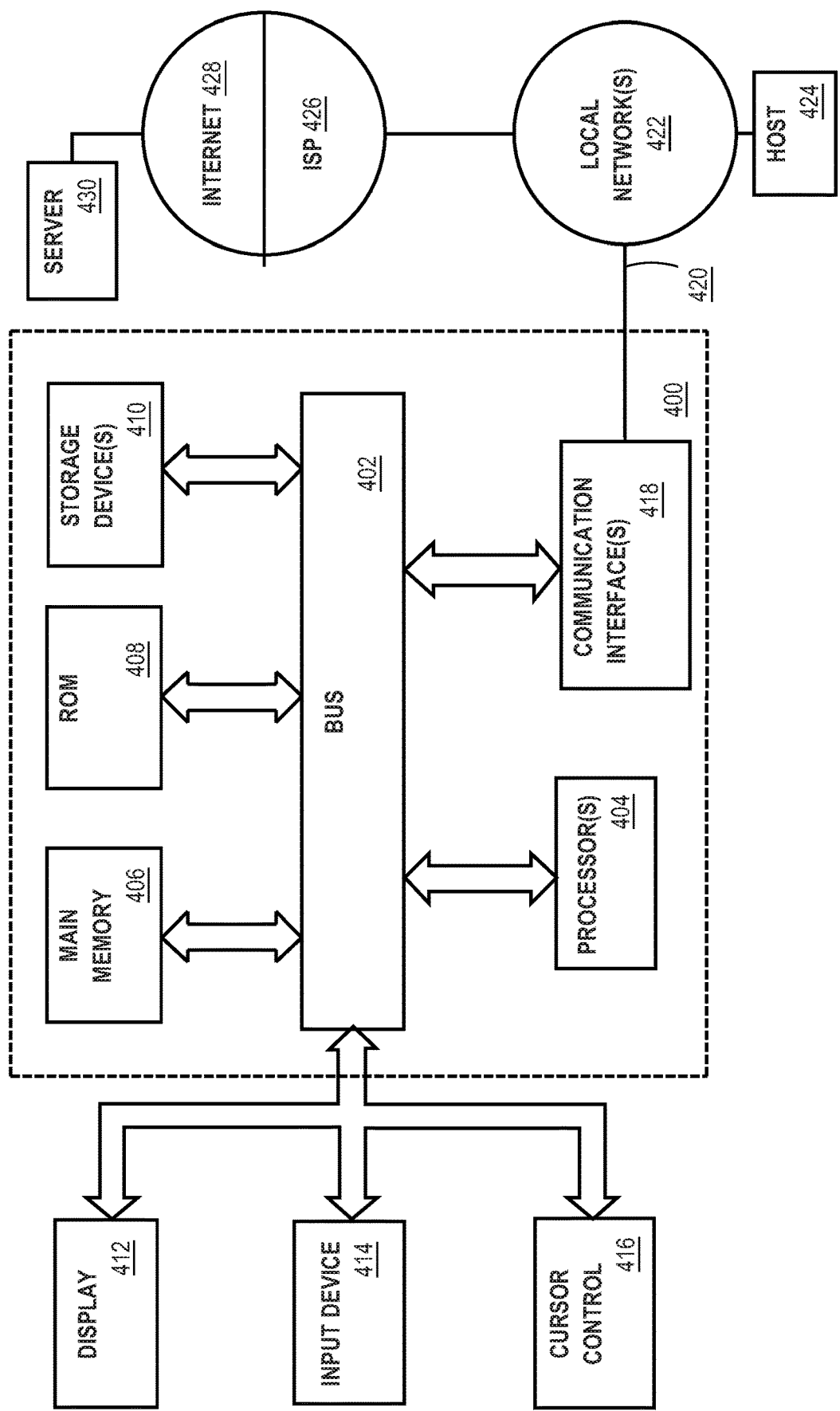
FIG. 4 is a block diagram of a computing device in which the example embodiment(s) of the present invention may be embodied.

Referring now to FIG. 4, it is a block diagram that illustrates a computing device 400 in which the example embodiment(s) of the present invention may be embodied. Computing device 400 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 400 may include a bus 402 or other communication mechanism for addressing main memory 406 and for transferring data between and among the various components of device 400.

Computing device 400 may also include one or more hardware processors 404 coupled with bus 402 for processing information. A hardware processor 404 may be a general purpose microprocessor, a system on a chip (SoC), or other processor.

Main memory 406, such as a random access memory (RAM) or other dynamic storage device, also may be coupled to bus 402 for storing information and software instructions to be executed by processor(s) 404. Main memory 406 also may be used for storing temporary variables or other intermediate information during execution of software instructions to be executed by processor(s) 404.

Software instructions, when stored in storage media accessible to processor(s) 404, render computing device 400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 400 also may include read only memory (ROM) 408 or other static storage device coupled to bus 402 for storing static information and software instructions for processor(s) 404.

One or more mass storage devices 410 may be coupled to bus 402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 410 (e.g., the main hard disk for the device) stores a body of program and data for directing operation of the computing device, including an operating system, user application programs, driver and other support files, as well as other data files of all sorts.

Computing device 400 may be coupled via bus 402 to display 412, such as a liquid crystal display (LCD) or other electronic visual display, for displaying information to a computer user. In some configurations, a touch sensitive surface incorporating touch detection technology (e.g., resistive, capacitive, etc.) may be overlaid on display 412 to form a touch sensitive display for communicating touch gesture (e.g., finger or stylus) input to processor(s) 404.

An input device 414, including alphanumeric and other keys, may be coupled to bus 402 for communicating information and command selections to processor 404. In addition to or instead of alphanumeric and other keys, input device 414 may include one or more physical buttons or switches such as, for example, a power (on/off) button, a "home" button, volume control buttons, or the like.

Another type of user input device may be a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

While in some configurations, such as the configuration depicted in FIG. 4, one or more of display 412, input device 414, and cursor control 416 are external components (i.e., peripheral devices) of computing device 400, some or all of display 412, input device 414, and cursor control 416 are integrated as part of the form factor of computing device 400 in other configurations.

Functions of the disclosed systems, methods, and modules may be performed by computing device 400 in response to processor(s) 404 executing one or more programs of software instructions contained in main memory 406. Such software instructions may be read into main memory 406 from another storage medium, such as storage device(s) 410. Execution of the software instructions contained in main memory 406 cause processor(s) 404 to perform the functions of the example embodiment(s).

While functions and operations of the example embodiment(s) may be implemented entirely with software instructions, hard-wired or programmable circuitry of computing device 400 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more software instructions to processor(s) 404 for execution. For example, the software instructions may initially be carried on a magnetic disk or solid-state drive of a remote computer. The remote computer can load the software instructions into its dynamic memory and send the software instructions over a telephone line using a modem. A modem local to computing device 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor(s) 404 retrieves and executes the software instructions. The software instructions received by main memory 406 may optionally be stored on storage device(s) 410 either before or after execution by processor(s) 404.

Computing device 400 also may include one or more communication interface(s) 418 coupled to bus 402. A communication interface 418 provides a two-way data communication coupling to a wired or wireless network link 420 that is connected to a local network 422 (e.g., Ethernet network, Wireless Local Area Network, cellular phone network, Bluetooth wireless network, or the like). Communication interface 418 sends and receives electrical, electromagnetic, or optical signals that carry digital data streams representing various types of information. For example, communication interface 418 may be a wired network interface card, a wireless network interface card with an integrated radio antenna, or a modem (e.g., ISDN, DSL, or cable modem).

Network link(s) 420 typically provide data communication through one or more networks to other data devices. For example, a network link 420 may provide a connection through a local network 422 to a host computer 424 or to data equipment operated by an Internet Service Provider (ISP) 426. ISP 426 in turn provides data communication services through the world-wide packet data communication network now commonly referred to as the "Internet" 428. Local network(s) 422 and Internet 428 use electrical, electromagnetic or optical signals that carry digital data streams. The signals through the various networks and the signals on network link(s) 420 and through communication interface(s) 418, which carry the digital data to and from computing device 400, are example forms of transmission media.

Computing device 400 can send messages and receive data, including program code, through the network(s), network link(s) 420 and communication interface(s) 418. In the Internet example, a server 430 might transmit a requested code for an application program through Internet 428, ISP 426, local network(s) 422 and communication interface(s) 418.

The received code may be executed by processor 404 as it is received, and/or stored in storage device 410, or other non-volatile storage for later execution.

5.0 IMPLEMENTATION MECHANISMS—SOFTWARE OVERVIEW

Figure 5:
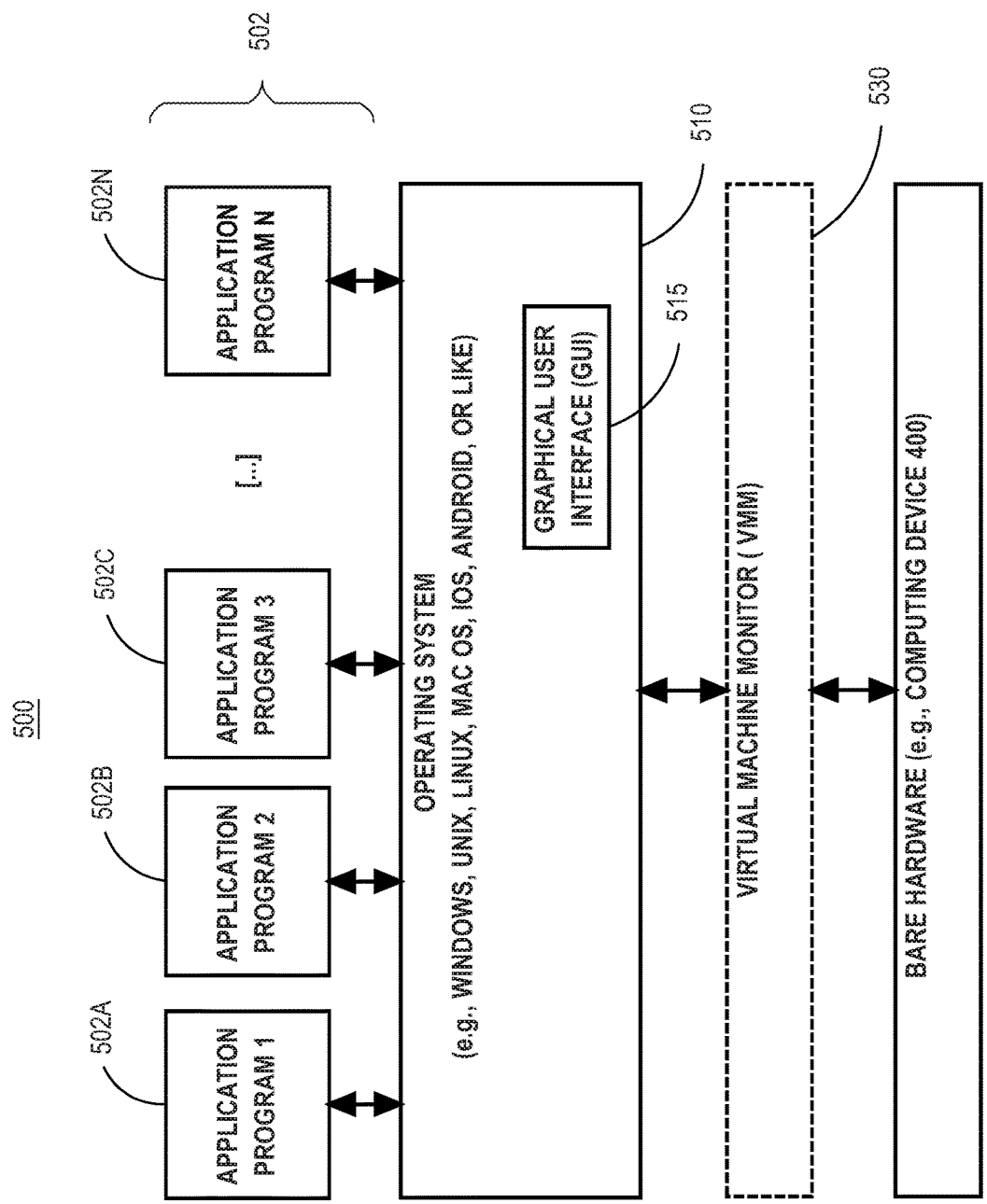
FIG. 5 is a block diagram of a software system for controlling the operation of the computing device.

FIG. 5 is a block diagram of a software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 OTHER ASPECTS OF DISCLOSURE

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
   receiving an incoming data request intended to be sent to a service application for further processing;
   receiving status information that describes performance of the service application;
   using two or more rules to determine, based on the status information, whether to allow the incoming data request to be sent to the service application for further processing;
   wherein a first rule of the two or more rules comprises: generating a random number; and
      comparing the status information regarding the performance of the service application to the random number to determine whether to allow the incoming data request to be sent to the service application for further processing;
   wherein a second rule of the two or more rules comprises:
   counting a total number of prior incoming data requests for a time window having a duration of a time window value;
   comparing the total number of prior incoming data requests to a minimum request count threshold to determine whether to allow the incoming data request to be sent to the service application for further processing;
   wherein the method is performed using one or more processors.

2. The method of claim 1, wherein the two or more rules comprises at least a third rule, wherein the third rule comprises:
   determining, using the status information, an error rate for the time window;
   comparing the error rate for the time window to a lower error rate threshold to determine whether to allow the incoming data request to be sent to the service application for further processing;
   comparing the error rate for the time window to an upper error rate threshold to determine whether to allow the incoming data request to be sent to the service application for further processing.

3. The method of claim 2, wherein comparing the status information regarding performance of the service application to the random number to determine whether to allow the incoming data request to be sent to the service application for further processing comprises comparing the error rate for the time window to the random number.

4. The method of claim 1, wherein comparing the status information regarding performance of the service application to the random number to determine whether to allow the incoming data request to be sent to the service application for further processing comprises comparing central processing unit (CPU) usage of the service application to the random number.

5. The method of claim 1, wherein comparing the status information regarding performance of the service application to the random number to determine whether to allow the incoming data request to be sent to the service application for further processing comprises comparing disk usage of the service application to the random number.

6. The method of claim 1, wherein comparing the status information regarding performance of the service application to the random number to determine whether to allow the incoming data request to be sent to the service application for further processing comprises comparing network latency of the service application to the random number.

7. The method of claim 1, further comprising:
   logging a log entry for the incoming data request comprising the status information.

8. The method of claim 1, wherein:
   the two or more rules comprises at least a third rule, wherein the second rule comprises applying a step function to the status information and determining whether to allow the incoming data request to be sent to the service application is based on a result of the step function;
   the status information comprises status information received over a period of time.

9. The method of claim 1, wherein:
   the two or more rules comprises at least a third rule, wherein the second rule comprises applying a linear function to the status information and determining whether to allow the incoming data request to be sent to the service application is based on a result of the linear function;
   the status information comprises status information received over a period of time.

10. One or more non-transitory computer-readable storage media storing instructions, which when executed by one or more processors, cause:
    receiving an incoming data request intended to be sent to a service application for further processing;
    receiving status information that describes performance of the service application;

using two or more rules to determine, based on the status information, whether to allow the incoming data request to be sent to the service application for further processing;

wherein a first rule of the two or more rules comprises: generating a random number; and comparing the status information regarding the performance of the service application to the random number to determine whether to allow the incoming data request to be sent to the service application for further processing;

wherein a second rule of the two or more rules comprises:

counting a total number of prior incoming data requests for a time window having a duration of a time window value;

comparing the total number of prior incoming data requests to a minimum request count threshold to determine whether to allow the incoming data request to be sent to the service application for further processing.

11. The one or more non-transitory computer-readable storage media of claim 10, wherein the two or more rules comprises at least a third rule, wherein the third rule comprises:

determining, using the status information, an error rate for the time window;

comparing the error rate for the time window to a lower error rate threshold to determine whether to allow the incoming data request to be sent to the service application for further processing;

comparing the error rate for the time window to an upper error rate threshold to determine whether to allow the incoming data request to be sent to the service application for further processing.

12. The one or more non-transitory computer-readable storage media of claim 11, wherein comparing the status information regarding performance of the service application to the random number to determine whether to allow the incoming data request to be sent to the service application for further processing comprises comparing the error rate for the time window to the random number.

13. The one or more non-transitory computer-readable storage media of claim 10, wherein comparing the status information regarding performance of the service application to the random number to determine whether to allow the incoming data request to be sent to the service application for further processing comprises comparing central processing unit (CPU) usage of the service application to the random number.

14. The one or more non-transitory computer-readable storage media of claim 10, wherein comparing the status information regarding performance of the service application to the random number to determine whether to allow the incoming data request to be sent to the service application for further processing comprises comparing disk usage of the service application to the random number.

15. The one or more non-transitory computer-readable storage media of claim 10, wherein comparing the status information regarding performance of the service application to the random number to determine whether to allow the incoming data request to be sent to the service application for further processing comprises comparing network latency of the service application to the random number.

16. The one or more non-transitory computer-readable storage media of claim 10, further comprising:

logging a log entry for the incoming data request comprising the status information.

17. The one or more non-transitory computer-readable storage media of claim 10, wherein:

the two or more rules comprises at least a third rule, wherein the second rule comprises applying a step function to the status information and determining whether to allow the incoming data request to be sent to the service application is based on a result of the step function;

the status information comprises status information received over a period of time.

18. The one or more non-transitory computer-readable storage media of claim 10, wherein:

the two or more rules comprises at least a third rule, wherein the second rule comprises applying a linear function to the status information and determining whether to allow the incoming data request to be sent to the service application is based on a result of the linear function;

the status information comprises status information received over a period of time.

* * * * *